(12) United States Patent
Wu

(10) Patent No.: US 7,502,282 B2
(45) Date of Patent: Mar. 10, 2009

(54) DIGITAL AUDIO SIGNAL PLAYER

(75) Inventor: Cheng-Chi Wu, Tainan Hsien (TW)

(73) Assignee: Ya Horng Electronic Co., Ltd., Tainan Hsien (TW)

( * ) Notice: Subject to any disclaimer, the term of this patent is extended or adjusted under 35 U.S.C. 154(b) by 665 days.

(21) Appl. No.: 11/176,555

(22) Filed: Jul. 7, 2005

(65) Prior Publication Data

US 2007/0008831 A1    Jan. 11, 2007

(51) Int. Cl.
*H04B 1/20* (2006.01)
(52) U.S. Cl. .............................. 369/4; 700/94; 381/119
(58) Field of Classification Search ..................... 369/4, 369/19, 69, 30.03; 700/94; 720/695; 381/119
See application file for complete search history.

(56) References Cited

U.S. PATENT DOCUMENTS

| 6,618,329 | B2 | 9/2003 | Liu | ............................... 369/4 |
| 6,745,091 | B2 * | 6/2004 | Liu | .............................. 700/94 |
| 7,010,371 | B2 * | 3/2006 | Liu | .............................. 700/94 |

\* cited by examiner

*Primary Examiner*—Ali Neyzari
(74) *Attorney, Agent, or Firm*—Alan Kamrath; Kamrath & Associates PA

(57) ABSTRACT

A digital audio signal player includes a reproducing unit to pick a disc audio signal which is stored in a disk, and a digital signal processor for controlling input and output of the disc audio signal of the memory. Thus, when the system processing unit receives the trigger signal of the trigger switch after the contact member is pressed to contact the trigger switch, the system processing unit drives the digital signal processor to modulate the disc audio signal stored in the memory according to the detected signal of the sensor so as to produce a special audio signal output.

7 Claims, 6 Drawing Sheets

DIGITAL AUDIO SIGNAL PLAYER

BACKGROUND OF THE INVENTION

1. Field of the Invention

The present invention relates to a digital audio signal player, and more particularly to a digital audio signal player having an operation unit freely operated by a user to modulate the output state of the disc audio signal by changing the rotation state of the operation unit.

2. Description of the Related Art

In general, the DJ (diskjockey) in the pub or the like often employs a "scratch" operation mode to play the music. When the user's hand touches the disk to change the rotation direction and speed of the disk, the music at the normal state is interrupted, thereby forming a special audio playing effect. After the user's hand is removed from the disk, the special audio playing effect disappears, and the music is played at the normal state.

A conventional digital audio signal player in accordance with the prior art was disclosed in U.S. Pat. No. 6,618,329-B2 and includes a conductive turntable, and a sensor for sensing the rotating speed and direction of the turntable so that the turntable has a smaller signal at the normal state. When the human body touches the turntable, there is produced a larger signal, named as a glitch below, which is guided by the turntable to be processed by an audio signal processor and a glitch detecting circuit and is then sent to a microprocessor which compares the differential between the smaller signal and the glitch. If the differential is greater than a predetermined value, the microprocessor judges that the turntable is under contact with the human body. Thus, when the user applies a force to rotate the turntable, the sensor detects the rotating speed and direction of the turntable so that the audio signal processor determines the output of the digital music data stored in the memory according to the detected state. Then, the digital music data after processed are converted into an analog format by a digital/analog converter, filtered by a low pass filter and finally played. When the microprocessor and the audio signal processor detect that the larger signal disappears after the human body's leaving the turntable, the music is returned to the normal state.

In conclusion, the conductive turntable being touched by the human body produces a glitch which is processed by the glitch detecting circuit and compared with the original signal to judge if the human body touches the turntable. However, the conventional digital audio signal player is performed in a crowded place and electrically connects with other electronic equipments, such as mixers, loudspeakers or the like. In such a manner, both the human body and other energized electronic equipments produce magnetic fields which produce different glitches to interfere with the detection of the glitch detecting circuit, so that the glitch detecting circuit is hard to judge if the human body touches the turntable exactly.

SUMMARY OF THE INVENTION

The primary objective of the present invention is to provide a digital audio signal player, wherein the "scratch" operation mode is opened when the press rods of the contact member contact the trigger switch and closed when the press rods of the contact member are detached from the trigger switch, so that the digital audio signal player is operated regularly, thereby facilitating the user operating the digital audio signal player.

Further benefits and advantages of the present invention will become apparent after a careful reading of the detailed description with appropriate reference to the accompanying drawings.

DETAILED DESCRIPTION OF THE INVENTION

Figure 1:
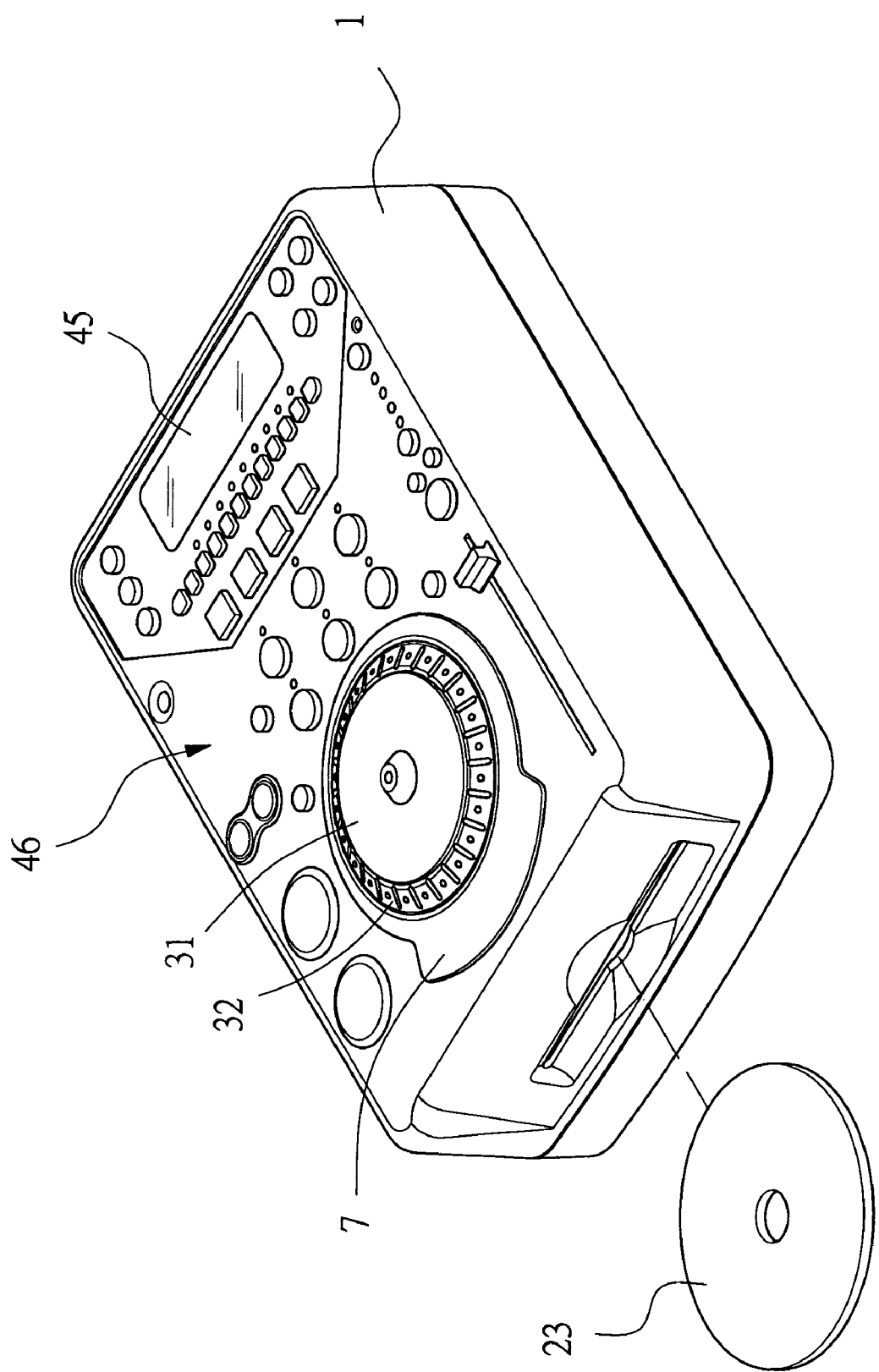
FIG. 1 is a perspective view of a digital audio signal player in accordance with the preferred embodiment of the present invention.
Figure 2:
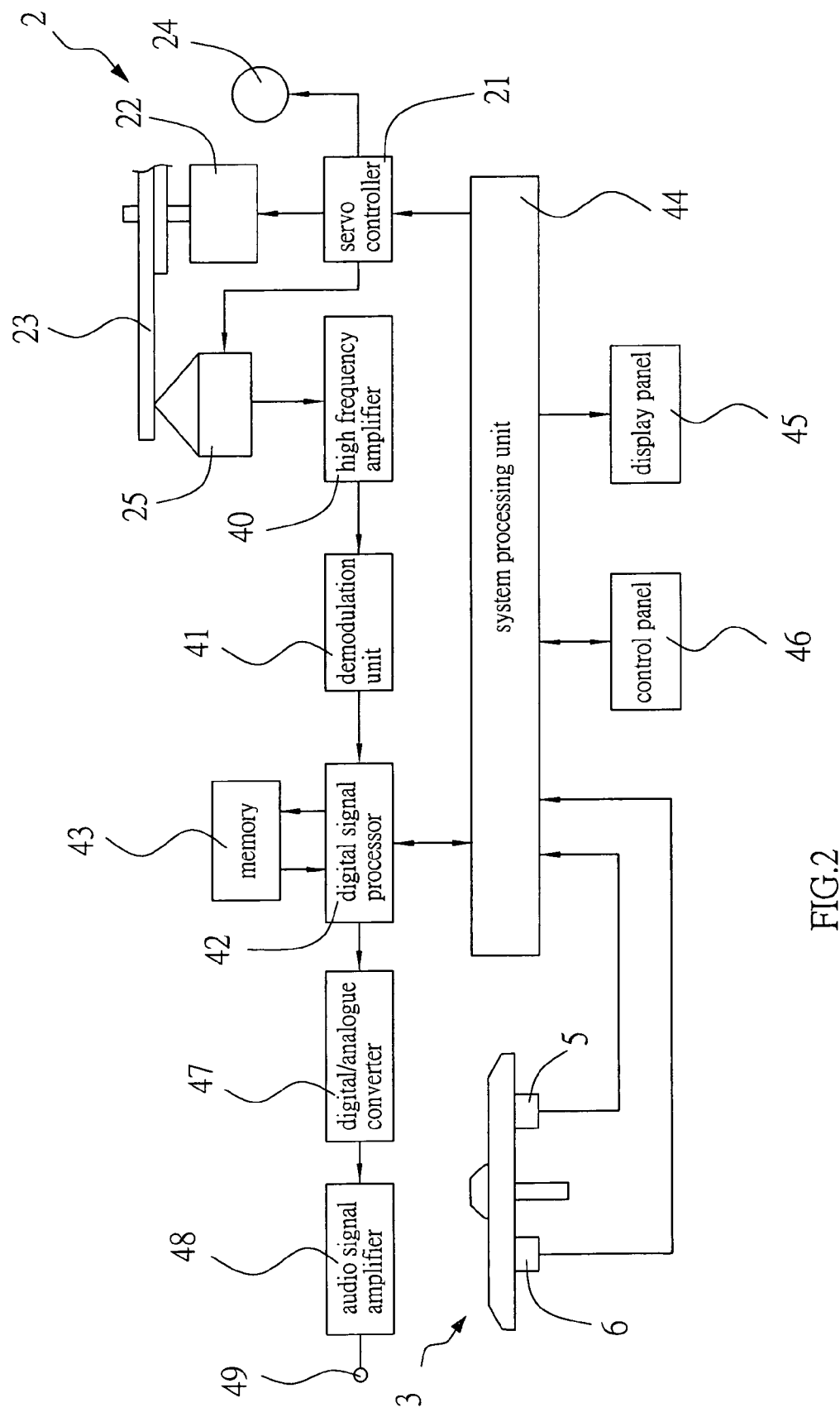
FIG. 2 is a block diagram of the digital audio signal player as shown in FIG. 1.
Figure 3:
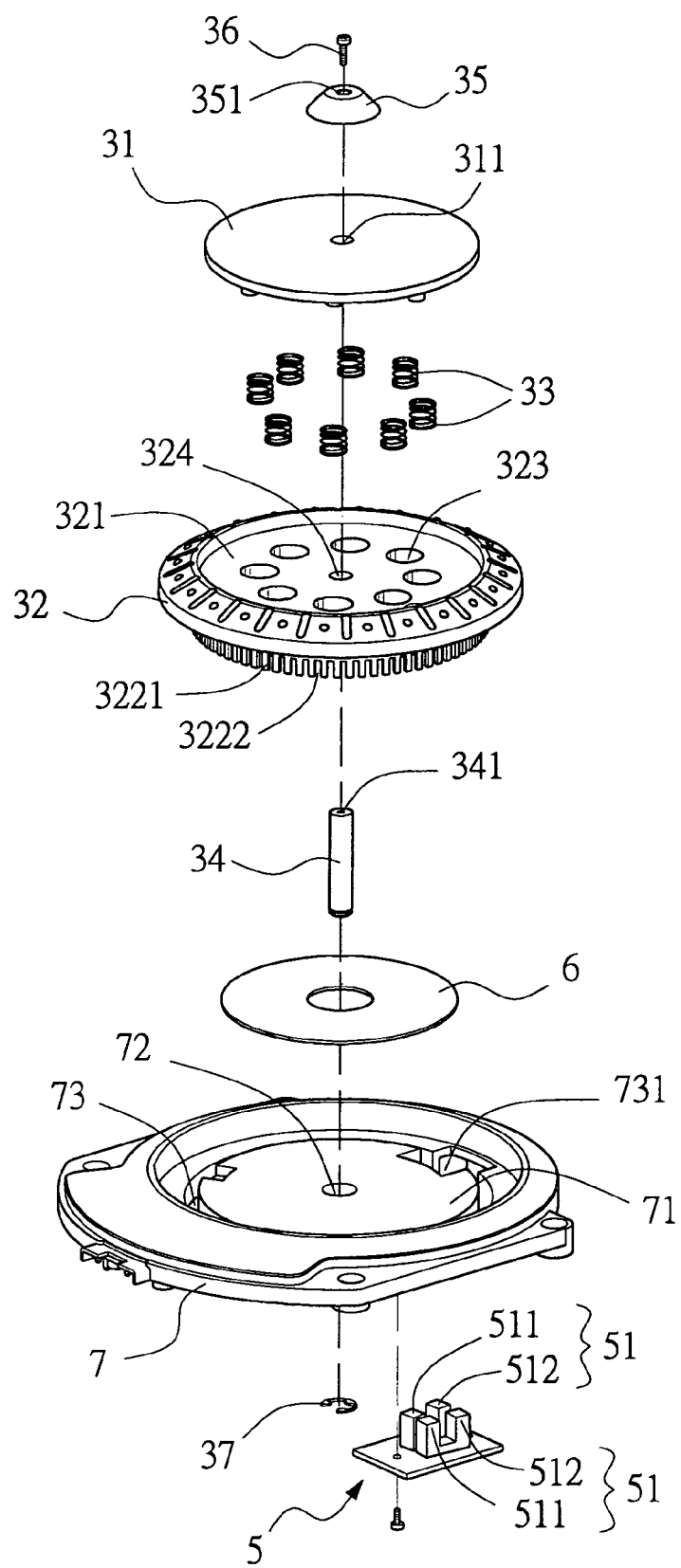
FIG. 3 is a partially exploded perspective view of the digital audio signal player as shown in FIG. 1.
Figure 4:
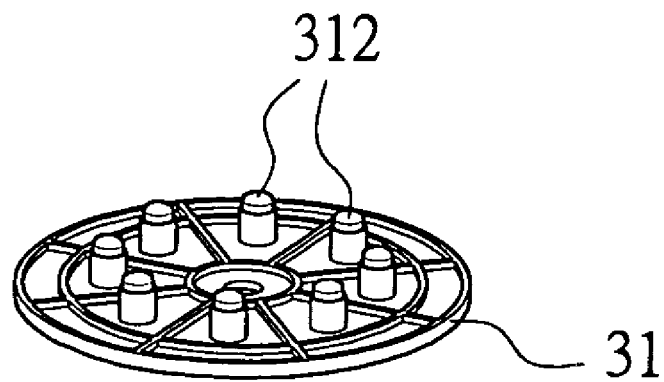
FIG. 4 is a perspective view of a contact member of the digital audio signal player as shown in FIG. 3.
Figure 5:
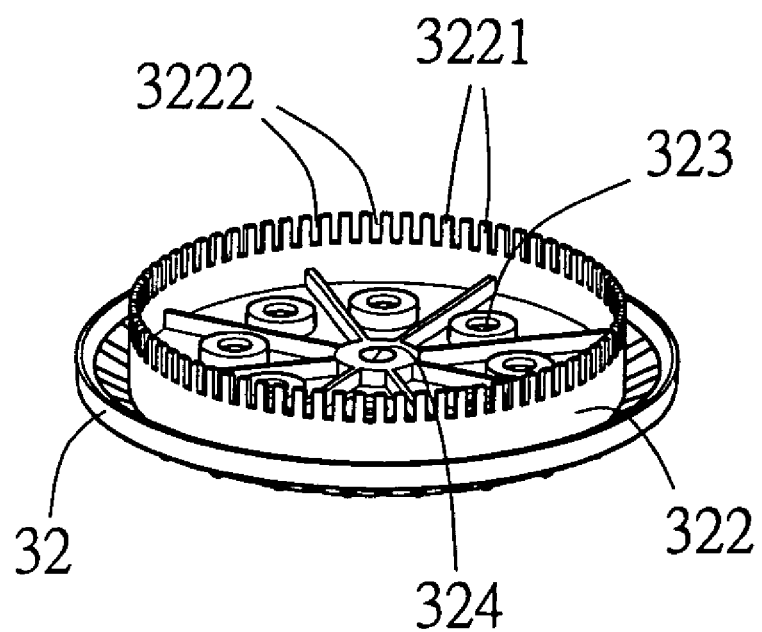
FIG. 5 is a perspective view of a rotation member of the digital audio signal player as shown in FIG. 3.
Figure 6:
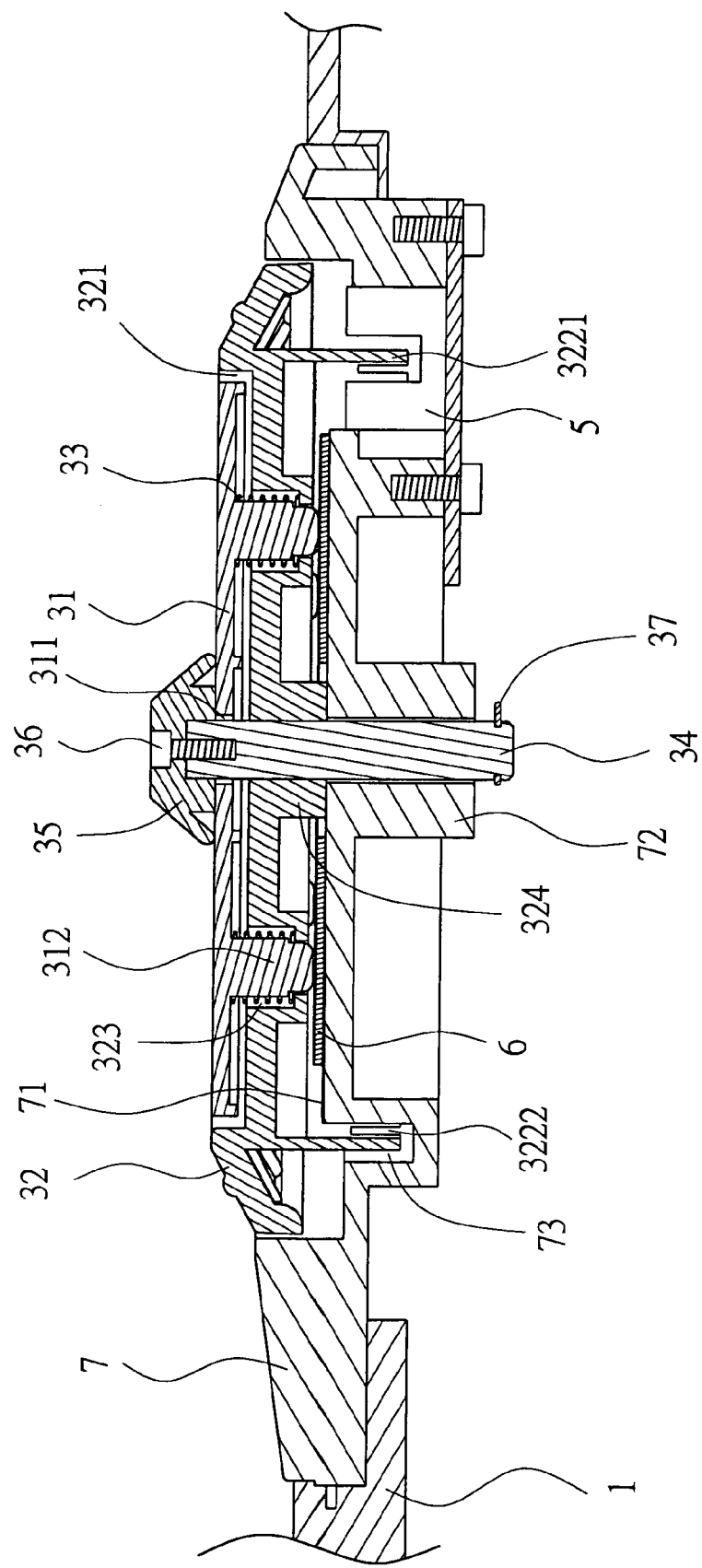
FIG. 6 is a plan cross-sectional assembly view of the digital audio signal player as shown in FIG. 3.

Referring to the drawings and initially to FIGS. 1 and 2, a digital audio signal player in accordance with the preferred embodiment of the present invention comprises a housing 1, a reproducing unit 2 mounted on the housing 1 to reproduce a disc audio signal, and an operation unit 3 mounted on the housing 1 and freely operated by a user to modulate the output state of the disc audio signal by changing the rotation state of the operation unit 3.

The reproducing unit 2 includes a servo controller 21 to control a drive motor 22 to rotate a disc 23 at a constant linear speed and to control a displacement motor 24 to drive an optical reader 25 to move along a radial direction of the disc 23 so that the optical reader 25 picks the disc audio signal stored in the disc 23. The disc audio signal picked by the optical reader 25 is amplified by a high frequency amplifier 40, then demodulated by a demodulation unit 41, then processed by a digital signal processor 42 and then stored in a memory 43.

The related message of the disc audio signal, such as the name and the playing time of the song, delivered by the digital signal processor 42 is controlled by a system processing unit 44 and shown on a display panel 45.

The system processing unit 44 is a micro processor which gives orders to control the related reproducing actions of the reproducing unit 2 so as to reproduce the disc audio signal. In addition, the system processing unit 44 is electrically connected to a control panel 46 so that a user can operate the function keys of the control panel 46 to control the operation of the system processing unit 44.

The operation unit 3 is a rotary body that is not driven by any powered motor. A sensor 5 is located under the operation unit 3 to detect the rotation state of the operation unit 3, and an annular trigger switch 6 is located under and triggered by the operation unit 3. After the trigger switch 6 is triggered by the operation unit 3, the operation unit 3 is disposed at a "scratch" operation mode.

Referring to FIGS. 3-6, the operation unit 3 includes a contact member 31, and a rotation member 32.

The contact member 31 has a central portion formed with a shaft hole 311 and has a bottom face provided with a plurality of press rods 312.

The rotation member 32 has a first face formed with a receiving recess 321 to receive the contact member 31 and a second face formed with a toothed ring 322. The receiving recess 321 of the rotation member 32 has a plurality of mounting holes 323 to receive the press rods 312 of the contact member 31 and has a central portion formed with a shaft tube 324. The toothed ring 322 of the rotation member 32 has a lower portion formed with a plurality of convex portions 3221 and a plurality of concave portions 3222 arranged in a staggered manner.

In addition, the operation unit 3 further includes a plurality of springs 33 set around the press rods 312 of the contact member 31 in the mounting holes 323 of the rotation member 32 and urged between the contact member 31 and the rotation member 32 so that the contact member 31 is movable relative to the rotation member 32 elastically, a rotation shaft 34 extended through the shaft tube 324 of the rotation member 32 and the shaft hole 311 of the contact member 31 and having an upper end formed with a screw bore 341, a limit cap 35 mounted on the upper end of the rotation shaft 34 and rested on a top face of the contact member 31, and a locking screw 36 extended through a through hole 351 of the limit cap 35 and screwed into the screw bore 341 of the rotation shaft 34 so that the limit cap 35 is secured to the rotation shaft 34 to prevent the contact member 31 from detaching from the limit cap 35. The shaft hole 311 of the contact member 31 and the rotation shaft 34 have a clearance defined therebetween, and the rotation shaft 34 is forced into the shaft tube 324 of the rotation member 32 in a close fit manner.

The operation unit 3 is mounted on a base 7 located on the top face of the housing 1. The base 7 has an inside formed with a chamber 71 to receive the operation unit 3. The chamber 71 of the base 7 has a central portion formed with a mounting tube 72 to allow passage of the rotation shaft 34 and has a periphery formed with an annular groove 73 to allow passage of the toothed ring 322 of the rotation member 32. The annular groove 73 of the base 7 has an opening 731 for mounting the sensor 5. The annular trigger switch 6 is mounted on the chamber 71 of the base 7 and faces the press rods 312 of the contact member 31.

The rotation shaft 34 is forced into the mounting tube 72 of the base 7 in a loose fit manner and has a lower end protruding from the mounting tube 72 of the base 7, and a snap ring 37 is secured on the lower end of the rotation shaft 34. The shaft tube 324 of the rotation member 32 has a bottom rested on the chamber 71 of the base 7. The contact member 31 is pushed outward by the springs 33 so that the contact member 31 is spaced from the rotation member 32, and the press rods 312 of the contact member 31 are spaced from the trigger switch 6.

The sensor 5 includes two spaced phase detection members 51 each having an optical emitting terminal 511 and an optical receiving terminal 512. The sensor 5 is mounted on the opening 731 of the base 7, the toothed ring 322 of the rotation member 32 is extended through the annular groove 73 of the base 7, and the convex portions 3221 and the concave portions 3222 of the toothed ring 322 are movable to pass between the optical emitting terminal 511 and the optical receiving terminal 512 of each of the two phase detection members 51 of the sensor 5.

Thus, when the convex portions 3221 of the toothed ring 322 are movable to pass between the optical emitting terminal 511 and the optical receiving terminal 512 of each of the two phase detection members 511, the optical signal emitted from the optical emitting terminal 511 is interrupted by the convex portions 3221 and cannot be received by the optical receiving terminal 512. Alternatively, when the concave portions 3222 of the toothed ring 322 are movable to pass between the optical emitting terminal 511 and the optical receiving terminal 512 of each of the two phase detection members 51, the optical signal emitted from the optical emitting terminal 511 is not interrupted by the concave portions 3222 and can be received by the optical receiving terminal 512. In such a manner, the sensor 5 detects the rotation state of the rotation member 32 of the operation unit 3 exactly, and transmits the detected signal to the system processing unit 44 for processing the detected signal.

In operation, when the contact member 31 is pressed downward by a user to overcome the elastic force of the springs 33, the press rods 312 of the contact member 31 are moved downward to contact and trigger the trigger switch 6, so that the system processing unit 44 starts the "scratch" operation mode according to the trigger signal produced by the trigger switch 6.

When the operation unit 3 is disposed at the "scratch" operation mode, the rotation member 32 and the contact member 31 of the operation unit 3 are together rotated by the user. Then, the sensor 5 detects the rotation state of the operation unit 3 exactly, and transmits the detected signal to the system processing unit 44 and to the digital signal processor 42 to be processed. Then, the output of the disk audio signal stored in the memory 43 is modulated by the digital signal processor 42 according to the detected signal of the sensor 5 to form a special audio signal output, and converted from the digital format to analogue format by a digital/analogue converter 47, and amplified by a audio signal amplifier 48 and then outputted from the output terminal 49.

When the contact member 31 is released from the user's contact, the contact member 31 is pushed upward by the restoring force of the springs 33, thereby detaching the press rods 312 of the contact member 31 from the trigger switch 6, so that the system processing unit 44 is unable to obtain the trigger signal of the trigger switch 6, thereby closing the "scratch" operation mode. Then, the system processing unit 44 drives the digital signal processor 42 to control the disc audio signal stored in the memory 43 being outputted at normal state instead of the special audio signal output.

Figure 7:
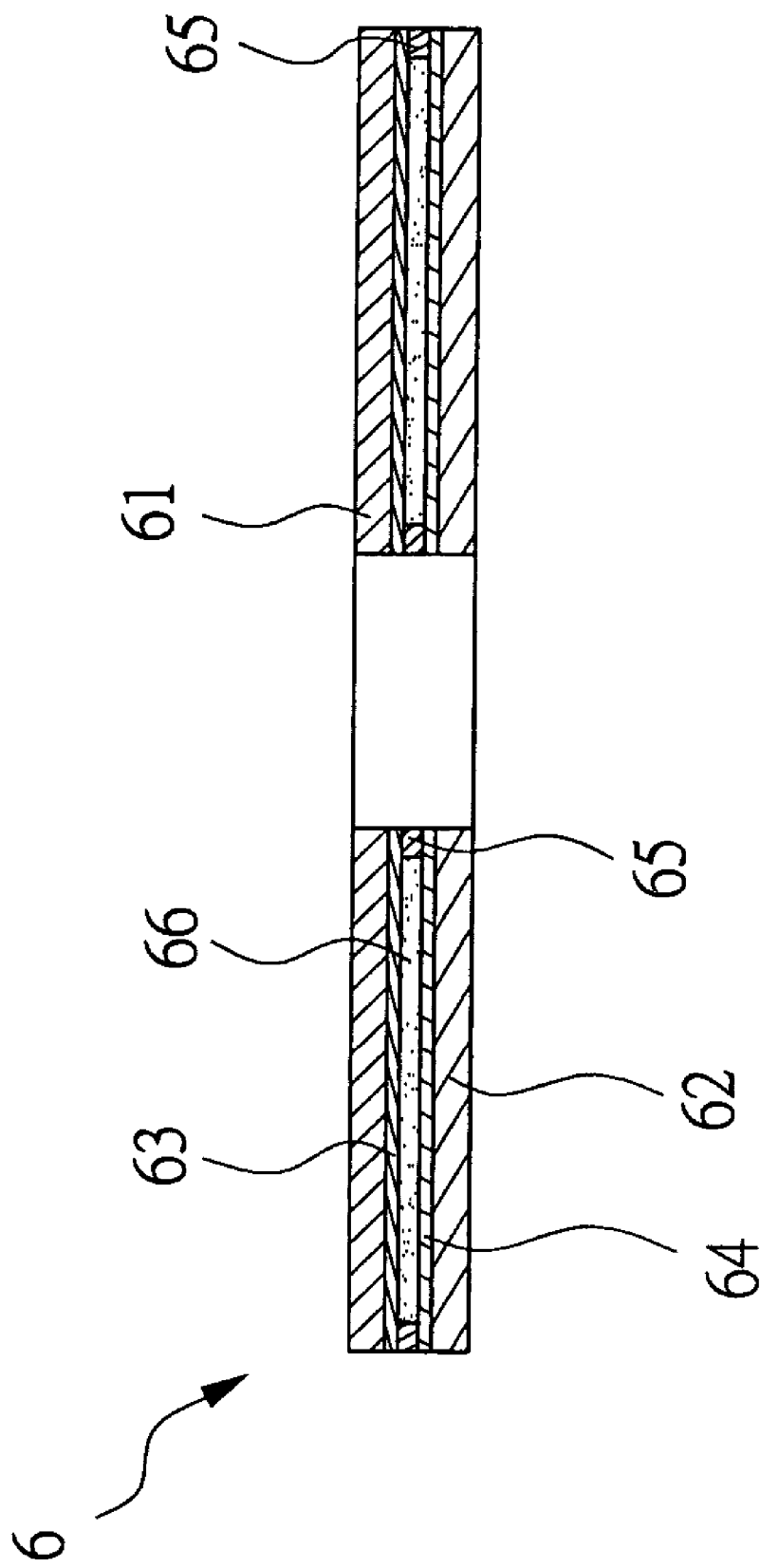
FIG. 7 is a plan cross-sectional assembly view of a trigger switch of the digital audio signal player as shown in FIG. 3.

Referring to FIG. 7, the trigger switch 6 is preferably a thin layer switch and includes a flexible upper surface layer 61, an upper conducting layer 63 mounted on a bottom of the upper surface layer 61, a flexible lower surface layer 62 spaced from the upper surface layer 61, a lower conducting layer 64 mounted on a top of the lower surface layer 62, an insulating fluid layer 66 located between the upper conducting layer 63 and the lower conducting layer 64 to provide an insulating effect, and an insulating glue 65 located between the upper conducting layer 63 and the lower conducting layer 64 to encompass the insulating fluid layer 66. Thus, when the upper surface layer 61 is pressed by the press rods 312 of the contact member 31, the upper conducting layer 63 is electrically connected to the lower conducting layer 64 to produce a trigger signal which is transmitted to the system processing unit 44. Alternatively, when the upper surface layer 61 is released from the press rods 312 of the contact member 31, the upper conducting layer 63 is separated and isolated from the lower conducting layer 64 by the insulating fluid layer 66, thereby stopping the trigger signal.

Thus, the user only needs to press the contact member 31 of the operation unit 3 to move the press rods 312 of the contact member 31 to contact and trigger the trigger switch 6 to open the "scratch" operation mode and to produce a trigger signal which is transmitted to the system processing unit 44 to drive the digital signal processor 42 to modulate the output of the disc audio signal stored in the memory 43 according to the detected signal of the sensor 5 so as to produce a special audio signal output. Alternatively, the user only needs to release the contact member 31 of the operation unit 3 to detach the press rods 312 of the contact member 31 from the trigger switch 6 to close the "scratch" operation mode, so that the system processing unit 44 drives the digital signal processor 42 to control the disc audio signal output stored in the memory 43 being outputted at normal state instead of the special audio signal output.

Accordingly, the system processing unit 44 opens the "scratch" operation mode when the press rods 312 of the contact member 31 contact the trigger switch 6 and closes the "scratch" operation mode when the press rods 312 of the contact member 31 are detached from the trigger switch 6, so that the digital audio signal player is operated regularly, thereby facilitating the user operating the digital audio signal player.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A digital audio signal player, comprising:
a reproducing unit to pick a disc audio signal;
an operation unit including a contact member, and a rotation member, wherein the contact member is movable relative to the rotation member elastically, and the contact member is rotated in concert with the rotation member when the contact member is pressed;
a sensor for detecting a rotation state of the operation unit and producing a corresponding detected signal;
a trigger switch for generating a trigger signal when the contact member contacts the trigger switch;
a memory for storing the disc audio signal picked by the reproducing unit;
a digital signal processor for controlling input and output of the disc audio signal of the memory;
a system processing unit for receiving and processing the detected signal of the sensor and the trigger signal of the trigger switch;
wherein the trigger switch is a thin layer switch and includes a flexible upper surface layer, an upper conducting layer mounted on a bottom of the upper surface layer, a flexible lower surface layer spaced from the upper surface layer, a lower conducting layer mounted on a top of the lower surface layer, an insulating fluid layer located between the upper conducting layer and the lower conducting layer to provide an insulating effect, and an insulating glue located between the upper conducting layer and the lower conducting layer to encompass the insulating fluid layer.

2. A digital audio signal player, comprising:
a reproducing unit to pick a disc audio signal;
an operation unit including a contact member, and a rotation member, wherein the contact member is movable relative to the rotation member elastically, and the contact member is rotated in concert with the rotation member when the contact member is pressed;
a sensor for detecting a rotation state of the operation unit and producing a corresponding detected signal;
a trigger switch for generating a trigger signal when the contact member contacts the trigger switch;
a memory for storing the disc audio signal picked by the reproducing unit;
a digital signal processor for controlling input and output of the disc audio signal of the memory;
a system processing unit for receiving and processing the detected signal of the sensor and the trigger signal of the trigger switch;
wherein the operation unit further includes at least one elastic member urged between the contact member and the rotation member.

3. A digital audio signal player, comprising:
a reproducing unit to pick a disc audio signal;
an operation unit including a contact member, and a rotation member, wherein the contact member is movable relative to the rotation member elastically, and the contact member is rotated in concert with the rotation member when the contact member is pressed;
a sensor for detecting a rotation state of the operation unit and producing a corresponding detected signal;
a trigger switch for generating a trigger signal when the contact member contacts the trigger switch;
a memory for storing the disc audio signal picked by the reproducing unit;
a digital signal processor for controlling input and output of the disc audio signal of the memory;
a system processing unit for receiving and processing the detected signal of the sensor and the trigger signal of the trigger switch;
wherein the contact member has at least one press rod that is movable to contact the trigger switch to produce the trigger signal.

4. The digital audio signal player in accordance with claim 3, wherein the rotation member has at least one mounting hole to receive the press rod of the contact member.

5. The digital audio signal player in accordance with claim 2, wherein the contact member has at least one press rod that is movable to contact the trigger switch to produce the trigger signal, and the elastic member is mounted on the press rod of the contact member.

6. The digital audio signal player in accordance with claim 1, wherein the operation unit further includes a rotation shaft extended through a rotation center of the rotation member and a rotation center of the contact member, wherein the contact member and the rotation shaft have a clearance defined therebetween, and the rotation shaft is forced into the rotation member in a close fit manner.

7. The digital audio signal player in accordance with claim 6, wherein the rotation shaft has an upper end formed with a screw bore, and the operation unit further includes a limit cap mounted on the upper end of the rotation shaft and rested on a top face of the contact member, and a locking screw extended through a through hole of the limit cap and screwed into the screw bore of the rotation shaft so that the limit cap is secured to the rotation shaft to prevent the contact member from detaching from the limit cap.

* * * * *